Sept. 27, 1955  M. WALTER  2,719,044
FRAME FOR MOTOR VEHICLES
Filed Feb. 14, 1952  3 Sheets-Sheet 1
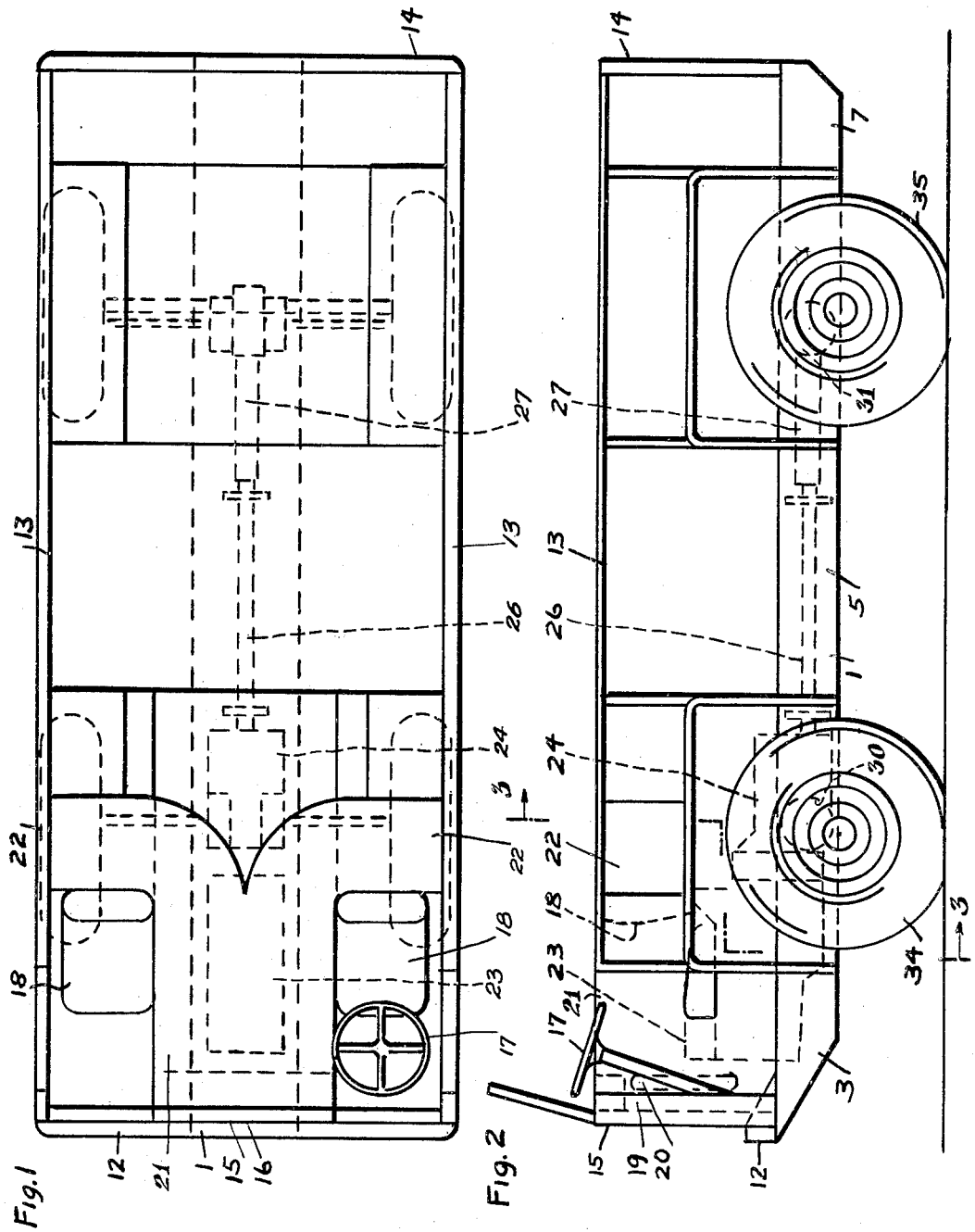
INVENTOR.
Maurice Walter
BY
Robert S. Dunham
ATTORNEY

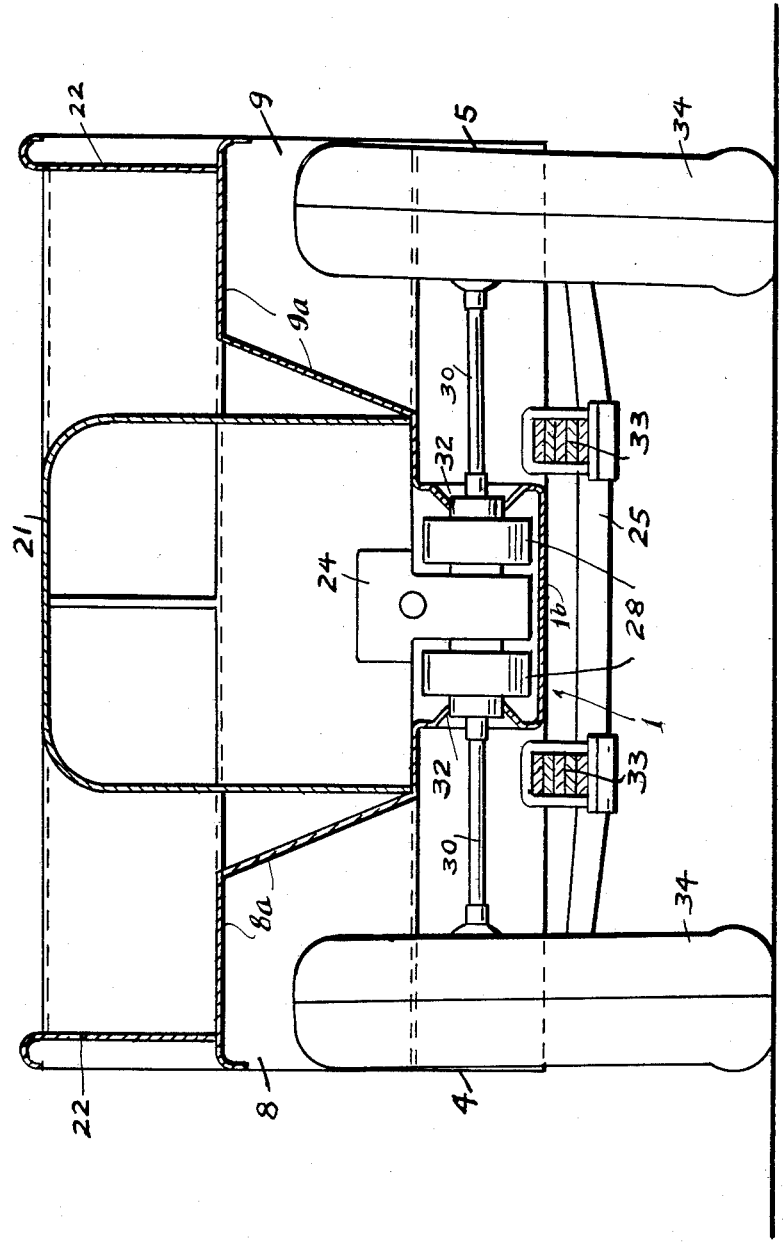

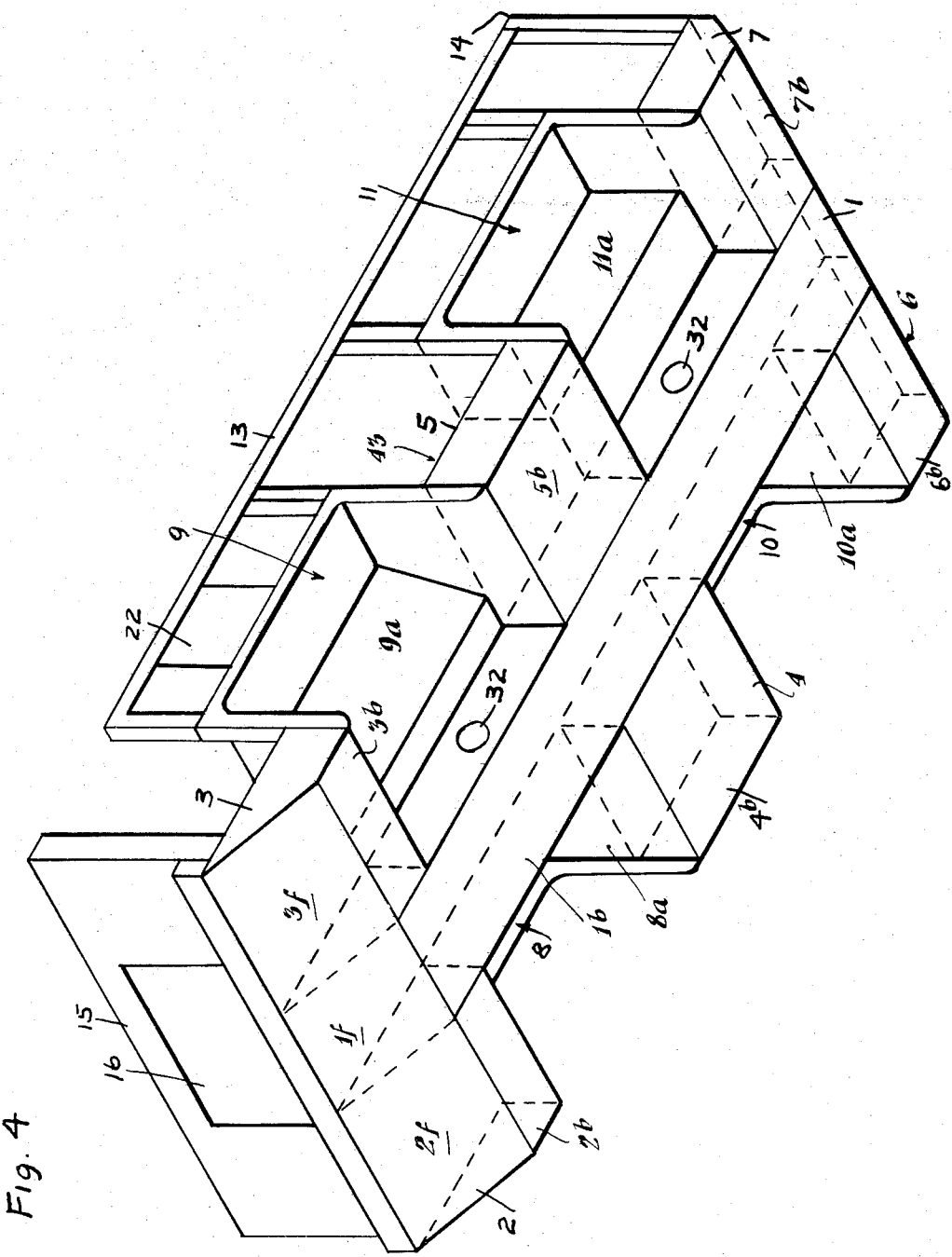

United States Patent Office 2,719,044
Patented Sept. 27, 1955

2,719,044

FRAME FOR MOTOR VEHICLES

Maurice Walter, New York, N. Y.

Application February 14, 1952, Serial No. 271,513

6 Claims. (Cl. 280—106)

This invention relates to an improved under frame for motor vehicles and more particularly to an under frame for military and off highway motor vehicles adapted for amphibious operations and for operations on land over rough ground.

Various multiple-wheel drive military and so-called off highway vehicles, such as jeeps and multiple wheel drive trucks, while intended for travel over difficult terrain, are not adapted for amphibious operations and such vehicles which have exposed running gear below the bottom of the vehicle frequently encounter brush or other obstacles which impede movement of the vehicle.

Generally, the present invention has for its objects the provision of an improved under frame which will minimize, if not entirely obviate, difficulties previously met with and further to provide a structure which will be adaptable for amphibious or semi-amphibious operations as well as for improved operation on the ground over rough terrain.

A further object of the present invention is to provide an improved frame for motor vehicles that will have a smooth, flat bottom, and which will enclose and protect the entire power plant and drive mechanism to permit more effective operation over rough irregular ground conditions and which will provide greater strength with simplicity and less weight.

Another object of the present invention is to provide an improved frame structure which has a smooth flat bottom the entire length and width of the vehicle with only pockets for the four wheels. The only vehicle parts that are below the frame bottom are the load carrying axles.

A further object of the present invention is to provide an improved frame structure for motor vehicles wherein the motor, transmission, propeller shaft, drive shafts, and all drive parts are all enclosed and protected by the frame structure thus affording natural fording protection for such parts.

A further object of the present invention is to provide a frame structure wherein the bottom frame boxes and wheel pockets are all secured together to reinforce and supplement the main center longitudinal housing and form a floor for the vehicle.

A further object of the present invention is to provide a motor vehicle frame construction wherein body side sections are secured to the bottom and frame boxes and wheel pockets to further strengthen and stiffen the structure and to eliminate the necessity of providing separate parts for body and frame.

Further and other objects and advantages of the present invention will be hereinafter described in the accompanying specification and shown in the drawings which illustrate what I now deem to be a preferred embodiment of the invention.

The invention relates broadly to an under frame for motor vehicles comprising a structure which affords a smooth flat bottom co-extensive with the length and breadth of the vehicle. The structure includes wheel box members joined to the flat bottom structure and defining sealed wheel pockets with enclosing walls which extend upwardly from said flat bottom of the under frame. More specifically, the frame structure includes a main center U-shaped member which extends the entire length of the vehicle for enclosing and protecting the motor, transmission, and drive shaft parts. This main U-shaped member may have a flat bottom portion with lateral frame box extensions secured thereto or integral therewith forming a continuation of the smooth flat bottom of the U-shaped member. The wheel box members secured to said extensions and to the main U-shaped member define wheel pockets.

For a more complete description of the invention, reference is made to the drawings wherein:

Fig. 1 is a plan view of a motor vehicle embodying the improved frame structure of this invention;

Fig. 2 is a side view of the structure shown in Fig. 1;

Fig. 3 is a vertical sectional view taken along the line 3—3 in Fig. 2; and

Fig. 4 is an isometric view of the improved frame structure viewed from the bottom thereof, looking upward from a point below the front end of the structure.

The improved frame structure includes a main center longitudinal frame member 1 having a generally U-shaped configuration when viewed in vertical transverse section. The main center longitudinal frame member 1 has a substantially flat bottom portion 1b which extends the entire length of the vehicle as best shown in Figs. 1 and 4. The front end 1f and the rear end may be sloped upwardly for a purpose which will be described hereinbelow.

Attached to the main center longitudinal frame member 1 are front frame box extensions 2 and 3. The box extensions 2 and 3 may be secured to the center frame member 1 by welding or by other suitable means. Center frame box extensions 4 and 5 are fixed to the main longitudinal frame member 1 on the sides and intermediate the ends of member 1, as best shown in Fig. 4. Rear frame box extensions 6 and 7 are mounted on the sides of the longitudinal frame member 1 adjacent to the rear thereof.

Wheel pockets 8, 9, 10 and 11 are defined by suitable wheel box housings 8a, 9a, 10a and 11a, respectively, which are secured in any suitable manner as by welding to frame box extensions and to the main longitudinal frame.

The members 1 to 11a comprise the frame members of the improved frame structure of this invention and may be joined together in the arrangement shown in Fig. 4 in any suitably rigid manner as by welding, bolting, or riveting to form an integral frame structure. The frame box extensions 2, 3, 4, 5, 6 and 7 may be water-tight compartments adapted to provide a water-tight bottom for the vehicle.

The box extensions 2, 3, 4 and 5 are fixed to the main longitudinal frame member 1 so that the bottom portions 2b, 3b, 4b, and 5b of the box extensions are substantially co-planar with the flat bottom 1b of the member 1. Therefore, when the frame members are in the assembled position shown the frame structure presents a flat bottom surface extending the entire length and width of the vehicle except for the pockets for the four wheels.

The front frame box extensions 2 and 3 have upwardly sloped front ends 2f and 3f corresponding to the sloped front end 1f of the main longitudinal frame member 1. Also the rear frame box extensions 6 and 7 have upwardly sloping rear ends corresponding to the sloping rear end portion of the member 1 (see Figs. 2 and 4).

The sloping front and rear ends of the frame reduce the resistance of the frame to undercarriage obstructions when the vehicle is operated on land or in the water.

A bumper 12 may be fixed to the front of the frame structure and specifically to the front parts of boxes 2 and 3 and to front of the longitudinal frame member 1. To the integral frame structure, body sides 13 can be either permanently or removably secured and such body side members may be closed or open as desired. Rear body member 14 similarly can be fixed to the main integral frame. The rear body member 14 may be arranged, if desired, as a tail gate so that access can be had to the rear of the vehicle.

A suitable dashboard 15 may be fixed to the front part of the frame structure. An air intake opening 16 may be provided in the face of the dashboard 15 and may be positioned at a suitably high location on said dashboard, to prevent the entry of water therethrough when the vehicle is operating in swamps or water.

A steering gear 17 of any suitable type may be located at the front of the vehicle as shown in Figs. 1 and 2 and seats 18 may also be located in the front of the vehicle preferably being disposed forward of front axle 25 so that access to the seats may be gained easily.

A radiator 19 is suitably located behind the air intake opening 16 and a fan 20 may be positioned behind the radiator 19 in the usual manner so that cool air may be drawn therethrough and into motor hood 21, as best shown in Fig. 3. Air discharge ports or openings 22 may be provided behind the seats 18 for the exhaust of air therethrough. The openings 22 are located in a relatively high position over the front wheels to prevent the entry of water therethrough under operational conditions. The arrangement of air intake 16 and air discharge openings 22 with regard to the motor hood 21 is best shown in Figs. 1 and 3. Motor 23 is located forward of the front axle and within the hood 21, the underside of the motor 23 being enclosed in the main longitudinal frame member 1.

A transmission 24 is located to the rear of the motor 23 in the main longitudinal frame member 1. The transmission 24 may be disposed directly over the front axle 25 as shown in Figs. 2 and 3. Propeller drive shaft 26 which is connected to the transmission 24 and is adapted to deliver power to rear bevel gear drive 27 is housed within the main longitudinal frame member 1. Brakes 28 for front wheels 34 also may be housed within the main longitudinal frame member 1, as best shown in Fig. 3. Similar brake members disposed in the main frame member 1 are provided for rear wheels 35. Front universal drive shafts 30 are provided for transmitting power to the front wheels 34, through suitable internal gears (not shown) provided in the wheels. Rear universal drive shafts 31 (indicated in dash lines in Fig. 2) are provided for driving rear wheels 35. The shafts 30 and corresponding rear drive shafts 31 extend through openings 32 in the main longitudinal frame member 1. Suitable packing may be provided around the openings 32 to seal them against water and dirt. The wheels 34 and 35 of the vehicle may be provided with any suitable type of springs. Arms with coil springs or torsion bars for independent wheel suspension may be used. However, in the form shown (see Fig. 3) leaf springs 33 are used in conjunction with the load carrying axles 25. It has been found practical to mount the axles and the springs for the wheels within the wheel pockets and outside the main longitudinal member 1.

It will be understood that with the frame members 1 to 11a welded or otherwise fixed securely together to constitute a rigid frame structure, no separate frame is necessary. Also with the body side sections 13, the rear section 14 and the dashboard 15 secured to the frame structure, which includes wheel pockets, no separate body is needed.

The floor of the vehicle is defined generally by the top portions of the frame box extensions 2—7 and by portions of the wheel box housings 8a—11a. The main longitudinal member 1 may be provided with a top portion substantially coplanar with the floor of the vehicle extending from the rear end of the motor hood 21 to the back end of the vehicle. The top portion of the main longitudinal member 1 may include one or more removable plates to permit access to the propeller drive shaft 26 and the bevel gear drive 27 contained within the main frame member 1.

Suitable skirt portions are provided as part of the wheel box housings 8a—11a to form mud guards.

It will be appreciated that the described vehicle frame structure forms a substantial hull that has a smooth, flat bottom so that the vehicle can slide readily or be pulled easily over soft ground such as mud or snow for there are no projecting parts that would tend to dig in. Furthermore, the motor, the drive and the brakes are all well protected from ground obstacles such as rocks and tree stumps, and the vehicle can traverse dense brush without fouling or being damaged.

With the novel frame structure the vehicle may effectively ford relatively deep water for the bottom and sides are water tight, and the air intake and discharge openings 16 and 22, respectively, are above the water line.

The frame structure can be completely insulated and heated to permit operation in extremely cold temperatures for the motor, transmission, drive and brakes would all be within the insulated structure.

The frame of this invention fulfills all the objects set out above and provides a structure which is basically simpler, stronger and lighter than the conventional vehicle structure which includes a frame, fenders, a hood, cab and body which must have additional protective covering to accomplish the same results.

In accordance with the provisions of the Patent Statutes, I have herein described the principle of my invention, together with the elements which I now consider the best embodiments thereof, but it should be understood that the structure disclosed is only illustrative and the invention can be carried out by other means. Also, while it is designed to use the various features and elements in the combinations and relations described, some of these may be altered and modified without interfering with the more general results outlined.

What is claimed is:

1. An under frame structure for motor vehicles adapted for amphibious operations and for minimizing fouling of the vehicle upon passing over thick brush and other obstacles, said frame structure including a main center U-shaped member which extends the entire length of the vehicle for supporting, enclosing and protecting the motor, transmission and drive shaft parts, said main U-shaped member having a flat bottom portion with lateral frame box extensions secured thereto in alignment therewith providing a smooth flat bottom for the vehicle and a plurality of housing members secured to said extensions and to the main U-shaped member to define wheel pockets.

2. An under frame for a motor vehicle having front and rear wheels and which is adapted for amphibious operations and for operations over rough terrain which would tend to foul up the under gear and frame of a typical vehicle, said under frame comprising a main center U member which extends the entire length of the vehicle with a downwardly disposed flat bottom portion and upwardly extending portions for supporting, enclosing and protecting the motor, transmission, propeller shafts of the vehicle, said under frame also including a lateral frame box extension disposed ahead of the front wheels of the vehicle, between said front wheels and the rear wheels, and rearwardly of said rear wheels, said frame box extensions having their bottom surfaces flat and substantially coextensive with the bottom of said main center U member for the purpose described.

3. The invention according to claim 2, wherein the front frame box extensions and the center U member are provided with a bevelled front portion for the purpose described.

4. The invention according to claim 2, wherein pairs of wheel box housings are integrally united to the main U-shaped channel member and to said lateral frame box extensions to provide wheel pockets for the front and rear wheels of the vehicle.

5. The invention according to claim 2, wherein the under frame comprises vertically extending sections ahead of the forward wheel box pockets intermediate the forward and rear wheel box pockets and to the rear of the rear wheel box pockets secured to the lateral extensions to provide a water-proof enclosure for the bottom under frame portion of the vehicle.

6. An under frame structure for motor vehicles having front and rear wheels and adapted for amphibious operations and for minimizing fouling of the vehicle upon passing over thick brush and other obstacles, said frame structure comprising a substantially integral combined chassis and body bottom hull structure including upwardly recessed box pocket portions for each of the front and rear wheels, a centrally disposed U-shaped portion having a substantially smooth downwardly disposed bottom part and upwardly extending side portions for enclosing and protecting the transmission, the propeller shaft and the differential portions of the drive mechanism of the vehicle, said U-shaped portion extending in a direction longitudinal of the vehicle from at least a point forward of said box pocket portions for the front wheels to a point to the rear of said box pocket portions for the rear wheels, said hull structure further including lateral frame box extension portions providing parts of a smooth flat bottom for said hull structure in substantially the same plane as the bottom of said U-shaped portion.

References Cited in the file of this patent

UNITED STATES PATENTS

| | | |
|---|---|---|
| 1,678,180 | Cook | July 24, 1928 |
| 2,096,167 | Farraguia | Oct. 19, 1937 |
| 2,192,075 | Gregoire | Feb. 27, 1940 |

FOREIGN PATENTS

| | | |
|---|---|---|
| 155,540 | Great Britain | Sept. 29, 1921 |